(12) United States Patent
Kadono et al.

(10) Patent No.: US 11,642,655 B2
(45) Date of Patent: May 9, 2023

(54) MULTI-REGION TWC CATALYSTS FOR GASOLINE ENGINE EXHAUST GAS TREATMENTS

(71) Applicant: JOHNSON MATTHEY PUBLIC LIMITED COMPANY, London (GB)

(72) Inventors: Takeshi Kadono, Tochigi (JP); Kenji Tanikawa, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 198 days.

(21) Appl. No.: 17/248,004

(22) Filed: Jan. 5, 2021

(65) Prior Publication Data
US 2021/0205788 A1     Jul. 8, 2021

Related U.S. Application Data

(60) Provisional application No. 62/957,848, filed on Jan. 7, 2020.

(51) Int. Cl.
*B01J 21/06* (2006.01)
*B01J 23/10* (2006.01)
(Continued)

(52) U.S. Cl.
CPC ............ *B01J 21/066* (2013.01); *B01J 23/44* (2013.01); *B01J 23/464* (2013.01);
(Continued)

(58) Field of Classification Search
CPC . B01J 21/066; B01J 23/10; B01J 23/44; B01J 23/464; B01J 23/63; B01J 35/0026; B01J 35/023; F01N 3/101; F01N 3/2803
(Continued)

(56) References Cited

U.S. PATENT DOCUMENTS

5,376,610 A * 12/1994 Takahata ................. F01N 3/222
502/65
5,597,771 A *  1/1997 Hu ............................ B01J 23/63
502/333
(Continued)

FOREIGN PATENT DOCUMENTS

EP         3072588 B1    9/2016
WO    2017/117071 A1    7/2017

*Primary Examiner* — Cam N. Nguyen
(74) *Attorney, Agent, or Firm* — Ni Yan

(57) ABSTRACT

A catalytic article for treating exhaust gas comprising: a first catalytic region beginning at the inlet end and extending for less than the axial length L, wherein the first catalytic region comprises a first palladium component and a first oxygen storage capacity (OSC) material comprising ceria; a second catalytic region beginning at the outlet end and extending for less than the axial length L, wherein the second catalytic region comprises a second palladium component and a second OSC material comprising ceria; a third catalytic region beginning at the outlet end and extending for less than the axial length L, wherein the third catalytic region comprises a third rhodium component and a third OSC material comprising ceria; wherein at least a portion of the first catalytic region is not covered by the second catalytic region and/or the third catalytic region; and wherein (a) the ceria amount in the first catalytic region is less than 50% of the total ceria amount in the first, second, and third catalytic regions; or (b) the ceria loading in the first catalytic region is less than 50% of the sum of the ceria loading in the first, second, and third catalytic regions.

20 Claims, 7 Drawing Sheets

(51) Int. Cl.
*B01J 23/44* (2006.01)
*B01J 23/46* (2006.01)
*B01J 23/63* (2006.01)
*B01J 35/00* (2006.01)
*B01J 35/02* (2006.01)
*F01N 3/10* (2006.01)
*F01N 3/28* (2006.01)
*B01J 37/03* (2006.01)

(52) U.S. Cl.
CPC ......... *B01J 35/0026* (2013.01); *B01J 35/023* (2013.01); *B01J 37/038* (2013.01); *F01N 3/101* (2013.01); *F01N 3/2803* (2013.01); *F01N 2330/02* (2013.01); *F01N 2370/02* (2013.01)

(58) Field of Classification Search
USPC ........................................ 502/304, 339, 349
See application file for complete search history.

(56) References Cited

U.S. PATENT DOCUMENTS

| | | | | |
|---|---|---|---|---|
| 7,189,376 | B2* | 3/2007 | Kumar | F01N 3/28 422/177 |
| 7,524,465 | B2* | 4/2009 | Kumar | B01J 23/44 422/180 |
| 7,737,077 | B2* | 6/2010 | Kitamura | B01J 23/40 502/262 |
| 8,557,204 | B2* | 10/2013 | Nunan | B01J 35/0006 422/177 |
| 8,679,411 | B2* | 3/2014 | Akamine | B01J 37/0244 422/171 |
| 9,034,269 | B2* | 5/2015 | Hilgendorff | B01J 29/7415 502/262 |
| 9,327,239 | B2* | 5/2016 | Morgan | B01D 53/9454 |
| 9,486,791 | B2* | 11/2016 | Swallow | F01N 3/0814 |
| 9,604,175 | B2* | 3/2017 | Hatfield | B01J 23/8906 |
| 9,643,161 | B2* | 5/2017 | Chiffey | B01J 35/04 |
| 9,919,294 | B2* | 3/2018 | Laing | B01J 23/40 |
| 9,937,487 | B2* | 4/2018 | Miura | B01D 53/945 |
| 10,357,744 | B2* | 7/2019 | Ohashi | B01D 53/9472 |
| 10,512,898 | B2* | 12/2019 | Deeba | B01J 35/0006 |
| 10,618,034 | B2* | 4/2020 | Kasuya | F01N 3/2803 |
| 10,626,765 | B2* | 4/2020 | Inoda | F01N 3/0222 |
| 10,974,228 | B2* | 4/2021 | Chandler | B01J 37/0248 |
| 11,161,098 | B2* | 11/2021 | Nunan | B01J 37/0201 |
| 11,331,651 | B2* | 5/2022 | Andersen | B01J 37/0219 |
| 11,420,189 | B2* | 8/2022 | Sawada | F01N 3/2803 |
| 2012/0128557 | A1 | 5/2012 | Nunan et al. | |
| 2016/0236148 | A1* | 8/2016 | Yin | B01J 35/0013 |
| 2017/0043322 | A1* | 2/2017 | Chandler | F01N 3/0842 |
| 2018/0078898 | A1 | 3/2018 | Andersen et al. | |
| 2019/0136730 | A1* | 5/2019 | Onozuka | B01D 53/9445 |
| 2020/0276563 | A1* | 9/2020 | Cheng | B01J 37/0244 |
| 2020/0391187 | A1 | 12/2020 | Ji et al. | |
| 2022/0055021 | A1* | 2/2022 | Liu | B01D 53/9472 |
| 2022/0161236 | A1* | 5/2022 | Vjunov | B01J 23/40 |
| 2022/0193639 | A1* | 6/2022 | Vjunov | B01J 37/0244 |
| 2022/0203339 | A1* | 6/2022 | Zheng | B01J 23/46 |
| 2022/0212170 | A1* | 7/2022 | Sung | B01J 35/0006 |

* cited by examiner

MULTI-REGION TWC CATALYSTS FOR GASOLINE ENGINE EXHAUST GAS TREATMENTS

CROSS-REFERENCE

This application claims priority to U.S. Provisional Patent Application No. 62/957,848, filed on Jan. 7, 2020, the disclosure of which is incorporated herein by reference in its entirety for all purposes.

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

In most catalytic converters, the TWC is coated onto a high surface area substrate that can withstand high temperatures, such as flow-through honeycomb substrates. The large surface area of these substrates facilitates the improvement of the efficiency of the heterogeneous reactions, but can also contribute to the increase of exhaust backpressure, i.e., restrictions on the flow of exhaust gas from the engine to the tail pipe. Despite advances in TWC technology, there remains a need for improved catalytic converters for certain engine platforms that simultaneously improve the performance in cold start stage and/or give better light off performance. This invention solves these problems amongst others.

SUMMARY OF THE INVENTION

One aspect of the present disclosure is directed to a catalyst for treating gasoline engine exhaust gas comprising: a first catalytic region beginning at the inlet end and extending for less than the axial length L, wherein the first catalytic region comprises a first palladium component and a first oxygen storage capacity (OSC) material comprising ceria; a second catalytic region beginning at the outlet end and extending for less than the axial length L, wherein the second catalytic region comprises a second palladium component and a second OSC material comprising ceria; a third catalytic region beginning at the outlet end and extending for less than the axial length L, wherein the third catalytic region comprises a third rhodium component and a third OSC material comprising ceria; wherein at least a portion of the first catalytic region is not covered by the second catalytic region and/or the third catalytic region; and wherein (a) the ceria amount in the first catalytic region is less than 50% of the total ceria amount in the first, second, and third catalytic regions; or (b) the ceria loading in the first catalytic region is less than 50% of the sum of the ceria loading in the first, second, and third catalytic regions.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 1B depicts a variation of FIG. 1a.

FIG. 2b depicts a variation of FIG. 2a.

FIG. 3b depicts a variation of FIG. 3a.

FIG. 4b depicts a variation of FIG. 4a.

FIG. 5b depicts a variation of FIG. 5a.

FIG. 6b depicts a variation of FIG. 6a.

FIG. 7b depicts a variation of FIG. 7a.

DETAILED DESCRIPTION OF THE INVENTION

Figure 1A:
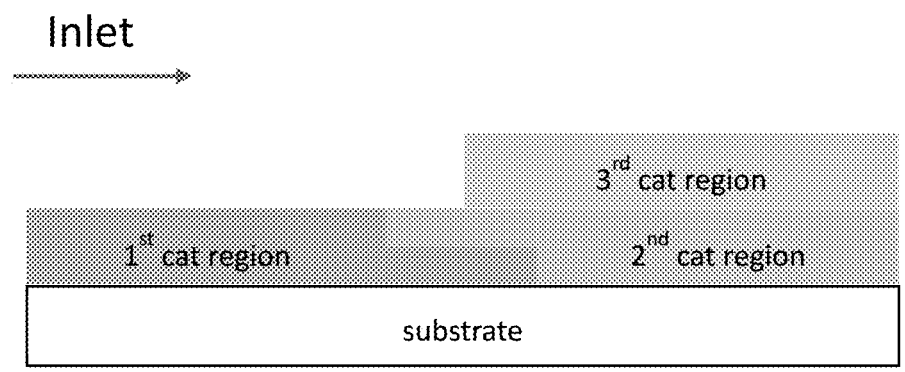
FIG. 1a depicts a first configuration in which first catalytic region extends from the inlet end, second catalytic region extends from the outlet end and partially covers the first catalytic region, and third catalytic region extends from the outlet end and partially covers the first catalytic region.

The present invention is directed to the catalytic treatment of combustion exhaust gas, such as that produced by gasoline and other engines, and to related catalysts and systems. More specifically, the invention relates the simultaneous treatment of $NO_x$, CO, and HC in a vehicular exhaust system. The inventors have discovered a synergistic relationship between the certain catalytically active metals and their ways of coating that unexpectedly produces a high conversion rate for $NO_x$, CO, and HC; improves the performance in cold start stage; and gives better light off performance; and gives low back pressure. The processes of the present invention also reduce costs of the catalyst.

One aspect of the present disclosure is directed to a catalyst for treating gasoline engine exhaust gas comprising: a first catalytic region beginning at the inlet end and extending for less than the axial length L, wherein the first catalytic region comprises a first palladium component and a first oxygen storage capacity (OSC) material comprising ceria; a second catalytic region beginning at the outlet end and extending for less than the axial length L, wherein the second catalytic region comprises a second palladium component and a second OSC material comprising ceria; a third catalytic region beginning at the outlet end and extending for less than the axial length L, wherein the third catalytic region comprises a third rhodium component and a third OSC material comprising ceria; wherein at least a portion of the first catalytic region is not covered by the second catalytic region and/or the third catalytic region; and wherein (a) the ceria amount in the first catalytic region is less than 50% of the total ceria amount in the first, second, and third catalytic regions; or (b) the ceria loading in the first catalytic region is less than 50% of the sum of the ceria loading in the first, second, and third catalytic regions.

The inventors have found that these catalysts in this way of coating show better catalyst performance that is not achieved using the catalyst separately or in conventional ways of coating. Among the unexpected benefits of the present invention are improved light off performance, during vehicle cold start stage, significantly reduced emissions of exhaust pollutions, and thus more easily achieved emission targets, compared to conventional TWC catalysts of similar concentration (e.g., washcoat loadings). The achievement of these benefits leads to the amounts of noble metals used in the catalysts and lower costs.

First Catalytic Region

The first catalytic region can extend for 1 to 50 percent of the axial length L. Preferably, the first catalytic region can extend for 10 to 40 percent, more preferably, 25 to 35 percent of the axial length L.

The first catalyst layer can comprise PGM metals other than the first palladium component, such as platinum and/or rhodium. The first catalytic region can further comprise a first rhodium component.

The first catalytic region can comprise 0.1-300 $g/ft^3$ of the first palladium or rhodium palladium component. Preferably, the first catalytic region can comprise 50-250 $g/ft^3$ of the first palladium or rhodium palladium component, more preferably, 100-220 $g/ft^3$ of the first palladium or rhodium palladium component, wherein the weight ratio of rhodium to palladium can be 60:1 to 1:60, preferably 30:1 to 1:30, more preferably 10:1 to 1:10.

The total washcoat loading of the first catalyst region can be less than 3.5 $g/in^3$, preferably, less than 3.0 $g/in^3$, 2.5 $g/in^3$, or 1.5 $g/in^3$.

The ceria amount in the first catalytic region can be no greater than 40%, 30%, 20%, or even 15% of the total ceria amount in the first, second, and third catalytic regions; alternatively or in addition, the ceria loading in the first catalytic region can be no greater than 40%, 30%, or even 25% of the sum of the ceria loading in the first, second, and third catalytic regions.

The first OSC material is preferably selected from the group consisting of cerium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as lanthanum, neodymium, praseodymium, yttrium oxides, etc. In addition, the first OSC material may function as a support material for the first palladium component.

The first catalytic region can further comprise a first alkali or alkaline earth metal component and/or a first inorganic oxide.

The first palladium component can be supported on both the first inorganic oxide and the first OSC material.

The ceria-zirconia mixed oxide can have a molar ratio of zirconia to ceria at least 50:50, preferably, higher than 60:40, more preferably, higher than 75:25.

The first OSC material (e.g., ceria-zirconia mixed oxide) can be from 10 to 90 wt %, preferably, 25-75 wt %, more preferably, 30-60 wt %, based on the total washcoat loading of the first catalytic region.

The first OSC material loading in the first catalytic region can be less than 1.5 $g/in^3$. In some embodiments, the first OSC material loading in the first catalytic region is no greater than 1.2 $g/in^3$, 1.0 $g/in^3$, 0.9 $g/in^3$, 0.8 $g/in^3$, or 0.7 $g/in^3$.

In some embodiments, the first alkali or alkaline earth metal may be deposited on the first OSC material. Alternatively, or in addition, the first alkali or alkaline earth metal may be deposited on the first inorganic oxide. That is, in some embodiments, the first alkali or alkaline earth metal may be deposited on, i.e. present on, both the first OSC material and the first inorganic oxide.

The first alkali or alkaline earth metal is generally in contact with the first inorganic oxide. Preferably the first alkali or alkaline earth metal is supported on the first inorganic oxide. Alternatively, the first alkali or alkaline earth metal may be in contact with the first OSC material.

The first alkali or alkaline earth metal is preferably barium, or strontium, and mixed oxides or composite oxides thereof. Preferably the barium or strontium, where present, is loaded in an amount of 0.1 to 15 wt %, and more preferably 3 to 10 wt % of barium or strontium, based on the total weight of the first catalytic region.

It is even more preferable that the first alkali or alkaline earth metal is strontium. The strontium, where present, is preferably loaded in an amount of 0.1 to 15 wt %, and more preferably 3 to 10 wt %, based on the total weight of the first catalytic region.

It is also preferable that the first alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the first catalytic region. It is more preferable that the first alkali or alkaline earth metal is composite oxide of barium and strontium.

Preferably the barium or the strontium is present as $BaCO_3$ or $SrCO_3$. Such a material can be performed by any method known in the art, for example incipient wetness impregnation or spray-drying.

The first inorganic oxide is preferably an oxide of Groups 2, 3, 4, 5, 13 and 14 elements. The first inorganic oxide is preferably selected from the group consisting of alumina, magnesia, silica, ceria, barium oxides, and mixed oxides or composite oxides thereof. Particularly preferably, the first inorganic oxide is alumina, lanthanum-alumina, ceria, or a magnesia/alumina composite oxide. One especially preferred first inorganic oxide is alumina or lanthanum-alumina composite oxides.

The first OSC material and the first inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

Second Catalytic Region

The second catalytic region can be essentially free of PGM metals other than the second palladium component.

The second catalytic region can extend for 50 to 90 percent of the axial length L. Preferably, the second catalytic region can extend for 55 to 85 percent, more preferably, 60 to 80 percent of the axial length L.

The second catalytic region can comprise PGM metals other than the second palladium component, such as platinum and/or rhodium. The second catalytic region can comprise 0.1-100 g/ft$^3$ of the second palladium or platinum palladium component. Preferably, the second catalytic region can comprise 5-60 g/ft$^3$, more preferably, 10-50 g/ft$^3$ of the second palladium or platinum palladium component, wherein the weight ratio of platinum to palladium can be 60:1 to 1:60, preferably 30:1 to 1:30, more preferably 10:1 to 1:10.

The second OSC material is preferably selected from the group consisting of cerium oxide, a ceria-zirconia mixed oxide, and an alumina-ceria-zirconia mixed oxide. More preferably, the second OSC material comprises the ceria-zirconia mixed oxide. In addition, the second OSC material may further comprise one or more of dopants like lanthanum, neodymium, praseodymium, yttrium etc. Moreover, the second OSC material may have the function as a support material for the second palladium component.

The second catalytic region can further comprise a second alkali or alkaline earth metal component and/or a second inorganic oxide.

The second palladium or platinum palladium component can be supported on both the second inorganic oxide and the second OSC material.

The ceria-zirconia mixed oxide can have a molar ratio of zirconia to ceria at least 50:50, preferably, higher than 60:40, more preferably, higher than 75:25.

The second OSC material (e.g., ceria-zirconia mixed oxide) can be from 10 to 90 wt %, preferably, 25-75 wt %, more preferably, 30-60 wt %, based on the total washcoat loading of the second catalytic region.

The second OSC material loading in the second catalytic region can be less than 1.5 g/in$^3$. In some embodiments, the second OSC material loading in the second catalytic region is no greater than 1.2 g/in$^3$, 1.0 g/in$^3$, 0.9 g/in$^3$, 0.8 g/in$^3$, or 0.7 g/in$^3$.

The total washcoat loading of the second catalyst region can be less than 3.5 g/in$^3$, preferably, less than 3.0 g/in$^3$, 2.5 g/in$^3$, or 1.5 g/in$^3$.

In some embodiments, the second alkali or alkaline earth metal may be deposited on the second OSC material. Alternatively, or in addition, the second alkali or alkaline earth metal may be deposited on the second inorganic oxide. That is, in some embodiments, the second alkali or alkaline earth metal may be deposited on, i.e. present on, both the second OSC material and the second inorganic oxide.

The second alkali or alkaline earth metal is generally in contact with the second inorganic oxide. Preferably the second alkali or alkaline earth metal is supported on the second inorganic oxide. In addition to, or alternatively to, being in contact with the second inorganic oxide, the second alkali or alkaline earth metal may be in contact with the second OSC material.

The second alkali or alkaline earth metal is preferably barium, strontium, mixed oxides or composite oxides thereof. Preferably the barium or strontium, where present, is in an amount of 0.1 to 15 wt %, and more preferably 3 to 10 wt % of barium or strontium, based on the total weight of the second catalytic region.

It is even more preferable that the second alkali or alkaline earth metal is strontium. The strontium, where present, is preferably present in an amount of 0.1 to 15 wt %, and more preferably 3 to 10 wt %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt %, and more preferably 3 to 10 wt %, based on the total weight of the second catalytic region. It is more preferable that the second alkali or alkaline earth metal is composite oxide of barium and strontium.

Preferably the barium or strontium is present as BaCO$_3$ or SrCO$_3$. Such a material can be performed by any method known in the art, for example incipient wetness impregnation or spray-drying.

The second inorganic oxide is preferably an oxide of Groups 2, 3, 4, 5, 13 and 14 elements The second inorganic oxide is preferably selected from the group consisting of alumina, magnesia, silica, ceria, barium oxides, and mixed oxides or composite oxides thereof. Particularly preferably, the second inorganic oxide is alumina, lanthanum-alumina, ceria, or a magnesia/alumina composite oxide. One especially preferred second inorganic oxide is alumina or lanthanum-alumina composite oxides.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

Third Catalytic Region

The third catalytic region can extend for 50 to 99 percent of the axial length L. Preferably, the third catalytic region can extend for 50 to 95 percent, more preferably, 60 to 95 percent of the axial length L.

The third catalytic region can be essentially free of PGM metals other than the third rhodium component.

The third catalytic region can comprise 0.1-20 g/ft$^3$ of the third rhodium or platinum rhodium component. In some embodiments, the third catalytic region can comprise 3-15 g/ft$^3$ or 5-13 g/ft$^3$ of the third rhodium or platinum rhodium component, wherein the weight ratio of platinum to rhodium can be 20:1 to 1:20, 15:1 to 1:15, or 10:1 to 1:10.

The total washcoat loading of the second catalyst region can be less than 3.5 g/in$^3$; preferably, less than 3.0 g/in$^3$ or 2 g/in$^3$; more preferably, less than 1.5 g/in$^3$ or 1.0 g/in$^3$.

The third OSC material is preferably selected from the group consisting of cerium oxide, a ceria-zirconia mixed oxide, and an alumina-ceria-zirconia mixed oxide. Preferably the third OSC material comprises ceria-zirconium mixed oxide, with one or more of dopants of lanthanum, neodymium, yttrium, praseodymium, etc. In addition, the third OSC material may function as a support material for the third rhodium component.

The third catalytic region can further comprise a third alkali or alkaline earth metal component and/or a third inorganic oxide.

The ceria-zirconia mixed oxide can have a molar ratio of zirconia to ceria at least 50:50; preferably, higher than 60:40; and more preferably, higher than 80:20.

The third OSC material can be from 10 to 90 wt %; preferably, 25-75 wt %; more preferably, 35-65 wt %; based on the total washcoat loading of the third catalytic region.

The third OSC material loading in the third catalytic region can be less than 2 g/in$^3$. In some embodiments, the third OSC material loading in the third catalytic region is no greater than 1.5 g/in$^3$, 1.2 g/in$^3$, 1.0 g/in$^3$, or 0.5 g/in$^3$.

In some embodiments, the ceria loading in the second catalytic region is greater than the ceria loading in the third catalytic region. In further embodiments, the ratio of the ceria loading in the second catalytic region to the ceria loading in the third catalytic region can be at least 3:2 or 2:1.

The third catalytic region can be substantially free of the third alkali or alkaline earth metal. Reference to "substantially free" means that the recited material may be intentionally or unintentionally present in the recited layer in minor amounts. For example, the alkali or alkaline earth metal might be present in the first and/or the second catalytic regions and some of the alkali or alkaline earth metal might migrate/leach into the third catalytic region unintentionally during the coating processes.

The third inorganic oxide is preferably an oxide of Groups 2, 3, 4, 5, 13 and 14 elements. The third inorganic oxide is preferably selected from the group consisting of alumina, ceria, magnesia, silica, lanthanum, zirconium, neodymium, praseodymium oxides, and mixed oxides or composite oxides thereof. Particularly preferably, the third inorganic oxide is alumina, a lanthanum/alumina composite oxide, or a zirconium/alumina composite oxide. One especially preferred third inorganic oxide is a lanthanum/alumina composite oxide or a zirconium/alumina composite oxide. The third inorganic oxide may be a support material for the third rhodium component, and/or for the third OSC materials.

Preferred the third inorganic oxides preferably have a fresh surface area of greater than 80 m$^2$/g, pore volumes in the range 0.1 to 4 mL/g. High surface area inorganic oxides having a surface area greater than 100 m$^2$/g are particularly preferred, e.g. high surface area alumina. Other preferred the third inorganic oxides include lanthanum/alumina composite oxides, optionally further comprising a zirconium-containing component, e.g. zirconia. In such cases the zirconium may be present on the surface of the lanthanum/alumina composite oxide, e.g. as a coating.

The third OSC material and the third inorganic oxide can have a weight ratio of at least 1:1, preferably, at least 2:1, more preferably, at least 3:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3.

In some embodiments, the first palladium component and the second palladium component has a weight ratio of from 50:1 to 1:50. In further embodiments, the first palladium component and the second palladium component has a weight ratio of from 30:1 to 1:30. In another further embodiment, the first palladium component and the second palladium component has a weight ratio of from 10:1 to 1:10. In yet another further embodiment, the first palladium component and the second palladium component has a weight ratio of from 7:1 to 1:7.

It is preferred that the first palladium component and the second palladium component has a weight ratio of greater than 1:1, more preferred, at least 3:2, 2:1 or 3:1; even more preferred, at least 4:1, 5:1, 6:1 or 7:1.

In some embodiments, the third rhodium component and the first palladium component has a weight ratio of from 60:1 to 1:60. Preferably, the third rhodium component and the first palladium component has a weight ratio of from 40:1 to 1:40. More preferably, the third rhodium component and the first palladium component has a weight ratio of from 30:1 to 1:30. Most preferably, the third rhodium component and the first palladium component has a weight ratio of from 10:1 to 1:10.

In certain embodiments, the total washcoat loading in the first catalytic region can be less than 50% of the sum of the total washcoat loading in the first, second, and third catalytic regions. In further embodiments, the total washcoat loading in the first catalytic region can be no more than 40% or 30% of the sum of the total washcoat loading in the first, second, and third catalytic regions. In yet another further embodiment, the total washcoat loading in the first catalytic region can be no more than 25% of the sum of the total washcoat loading in the first, second, and third catalytic regions.

The catalyst article of the invention may comprise further components that are known to the skilled person. For example, the compositions of the invention may further comprise at least one binder and/or at least one surfactant. Where a binder is present, dispersible alumina binders are preferred.

Configurations of First, Second, and Third Catalytic Regions

The second catalytic region can overlap with the first catalytic region for 1 to 15 percent of the axial length L (e.g., see FIG. 1a, FIG. 2a, FIG. 3b, FIG. 4b, and FIG. 5b; the first catalyst region can overlie the second catalytic region, or the second catalyst region can overlie the first catalytic region). Alternatively, the total length of the second catalytic region and the first catalytic region can equal to the axial length L. In yet another alternative, the total length of the second catalytic region and the first catalytic region can be less than the axial length L, for example, no greater than 95%, 90%, 80%, or 70% of the axial length L (e.g., see FIGS. 6a, 6b, 7a, and 7b).

In one aspect of the invention, various configurations of catalytic articles comprising the first, second, and third catalytic regions can be prepared as below.

FIG. 1a depicts a first configuration in which first catalytic region extends from the inlet end, second catalytic region extends from the outlet end and partially covers the first catalytic region, and third catalytic region extends from the outlet end and partially covers the first catalytic region.

In the first configuration, preferably, the first, catalytic region can extend for 5 to 50 percent or 10 to 50 percent of the axial length L; more preferably, 20 to 50 percent of the axial length L; and even more preferably, 25 to 40 percent of the axial length L.

The second, and third catalytic region, each independently can extend for 30 to 95 percent or 40 to 90 percent of the axial length L; more preferably, 50 to 85 percent of the axial length L; and even more preferably, 65 to 80 percent of the axial length L. In some embodiments, the overlap between the first and second catalytic regions can be at least 5%, 10%, or 15% of the axial length L. In certain embodiments, the overlap between the second and third catalytic regions can be at least 5%, 10%, or 15% of the axial length L.

Figure 1B:
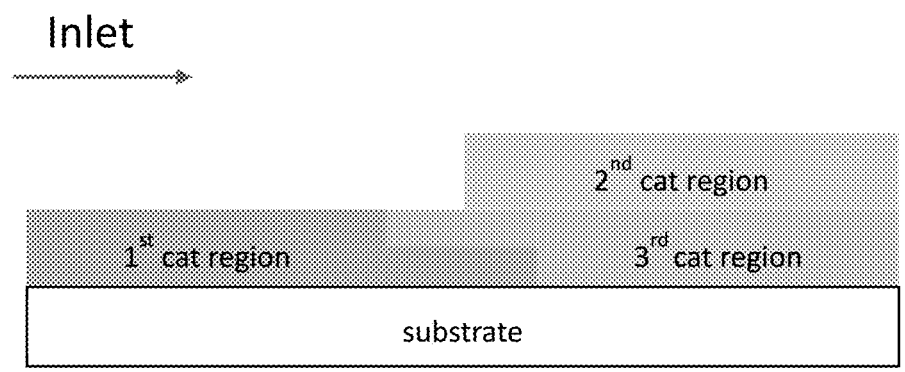

FIG. 1b depicts a variation of the first configuration, with 2$^{nd}$ catalytic region overlies 3$^{rd}$ catalytic region.

Figure 2A:
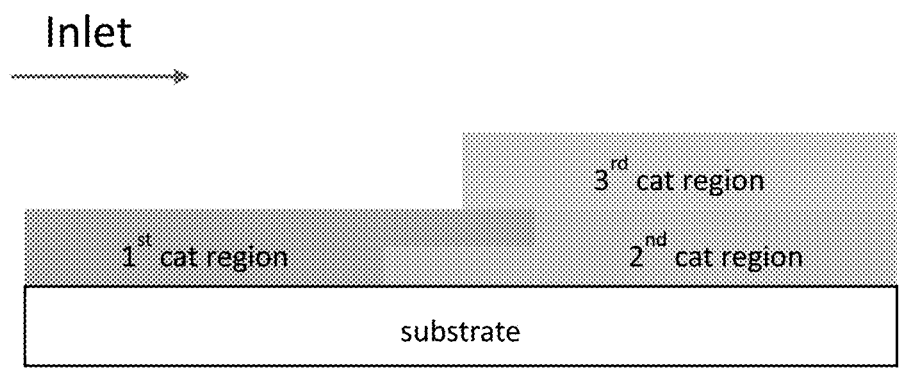
FIG. 2a depicts a second configuration in which second catalytic region extends from the outlet end, first catalytic region extends from the inlet end, and third catalytic region extends from the outlet end and covers the first catalytic region.

FIG. 2a depicts a second configuration in which second catalytic region extends from the outlet end, first catalytic region extends from the inlet end, and third catalytic region extends from the outlet end and covers the first catalytic region.

Figure 2B:
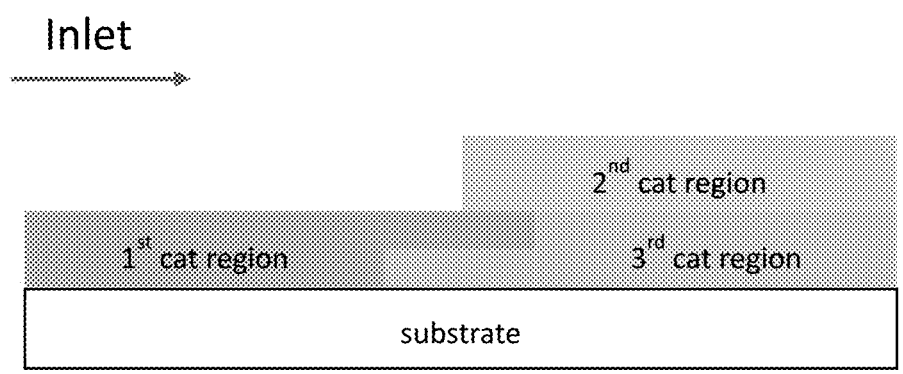

FIG. 2b depicts a variation of the second configuration, with 2$^{nd}$ catalytic region overlies 3$^{rd}$ catalytic region.

Figure 3A:
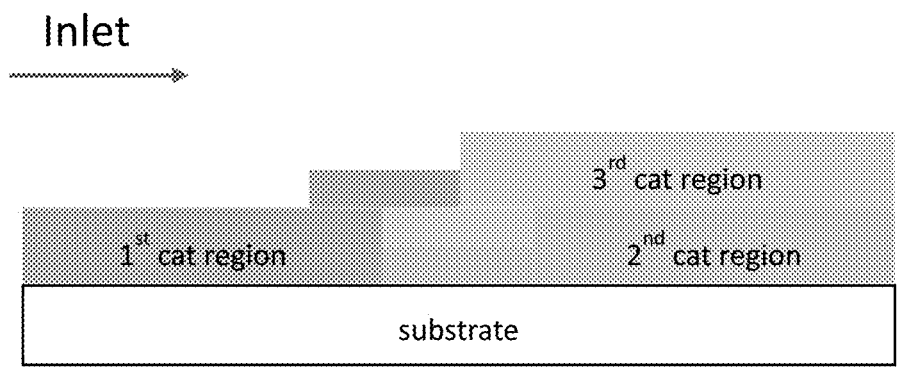
FIG. 3a depicts a third configuration in which second catalytic region extends from the outlet end; third catalytic region extends from the outlet end; and first catalytic region extends from the inlet end, partially covers the third catalytic region.

FIG. 3a depicts a third configuration in which second catalytic region extends from the outlet end; third catalytic region extends from the outlet end; and first catalytic region extends from the inlet end, partially covers the third catalytic region.

Figure 3B:
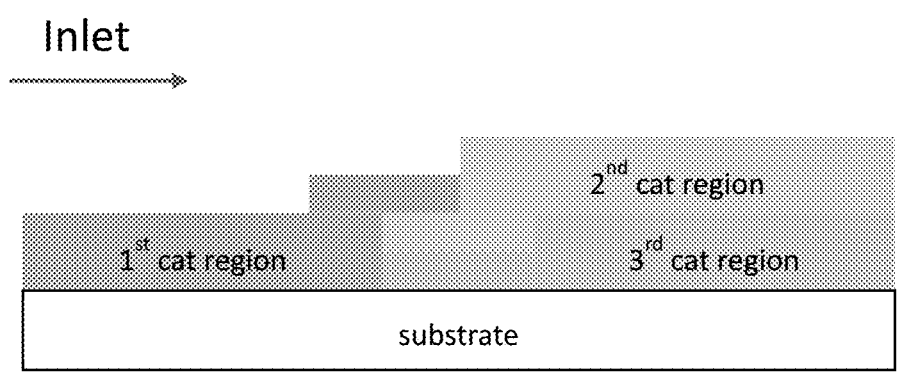

FIG. 3b depicts a variation of the third configuration, with 2$^{nd}$ catalytic region overlies 3$^{rd}$ catalytic region.

Figure 4A:
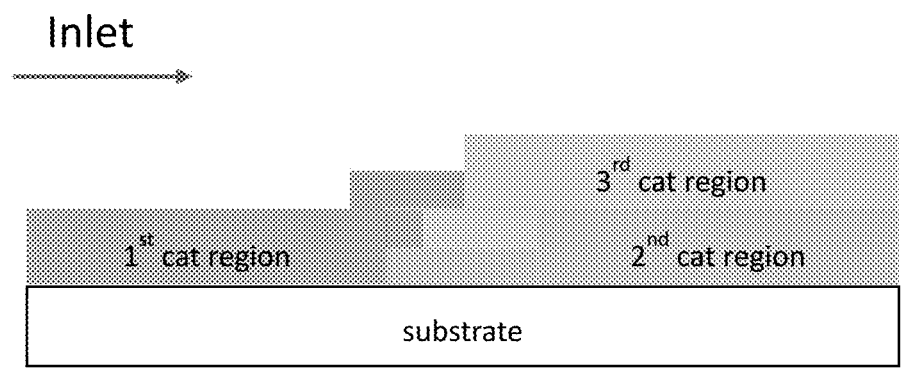
FIG. 4a depicts a fourth configuration in which second catalytic region extends from the outlet end, third catalytic region extends from the outlet end and partially covers the second catalytic region, and first catalytic region extends from the inlet end, partially covers the third catalytic region.

FIG. 4a depicts a fourth configuration in which second catalytic region extends from the outlet end, third catalytic region extends from the outlet end and partially covers the second catalytic region, and first catalytic region extends from the inlet end, partially covers the third catalytic region.

Figure 4B:
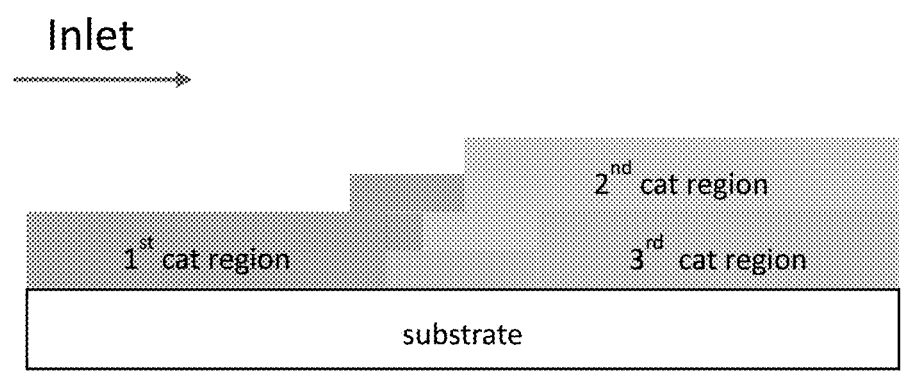

FIG. 4b depicts a variation of the fourth configuration, with 2$^{nd}$ catalytic region overlies 3$^{rd}$ catalytic region.

Figure 5A:
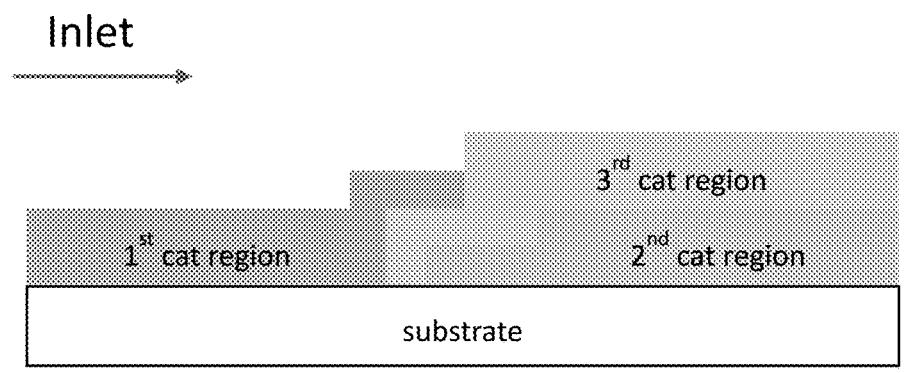
FIG. 5a depicts a fifth configuration in which second catalytic region extends from the outlet end, third catalytic region extends from the outlet end and covers the second catalytic region, and first catalytic region extends from the inlet end, partially covers the third catalytic region.

FIG. 5a depicts a fifth configuration in which second catalytic region extends from the outlet end, third catalytic region extends from the outlet end and covers the second catalytic region, and first catalytic region extends from the inlet end, partially covers the third catalytic region.

Figure 5B:
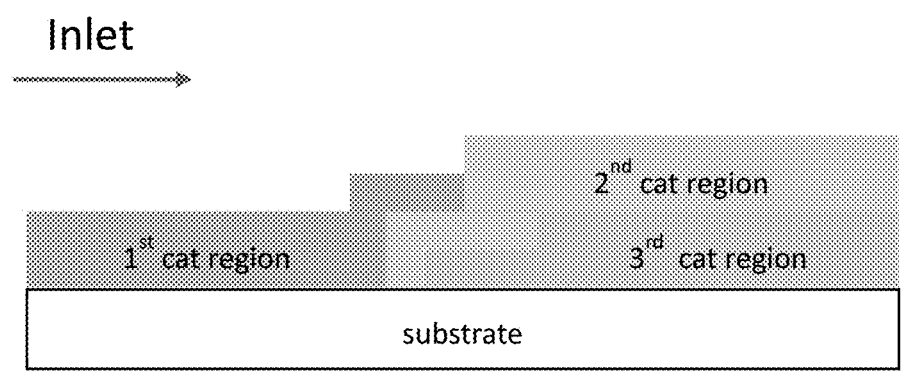

FIG. 5b depicts a variation of the fifth configuration, with 2$^{nd}$ catalytic region overlies 3$^{rd}$ catalytic region.

Figure 6A:
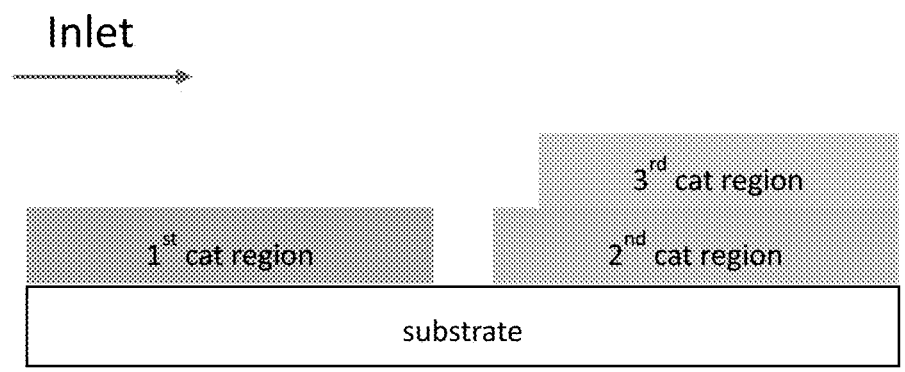
FIG. 6a depicts a sixth configuration in which second catalytic region extends from the outlet end, third catalytic region extends from the outlet end and partially covers the second catalytic region, and first catalytic region extends from the inlet end.

FIG. 6a depicts a sixth configuration in which second catalytic region extends from the outlet end, third catalytic region extends from the outlet end and partially covers the second catalytic region, and first catalytic region extends from the inlet end.

Figure 6B:
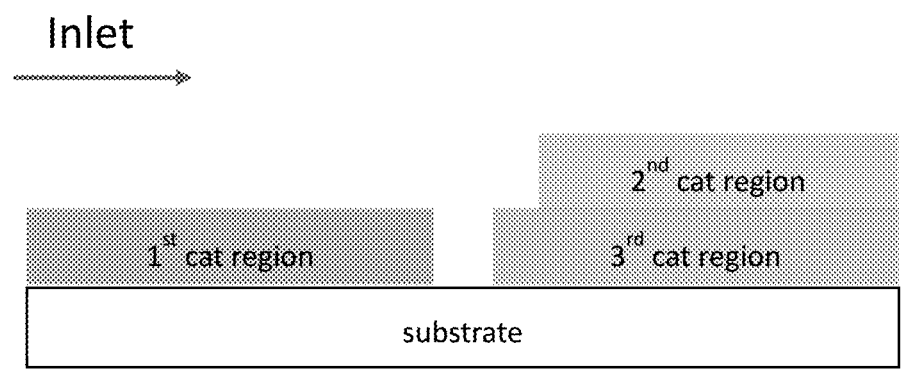

FIG. 6b depicts a variation of the sixth configuration, with 2$^{nd}$ catalytic region overlies 3$^{rd}$ catalytic region.

Figure 7A:
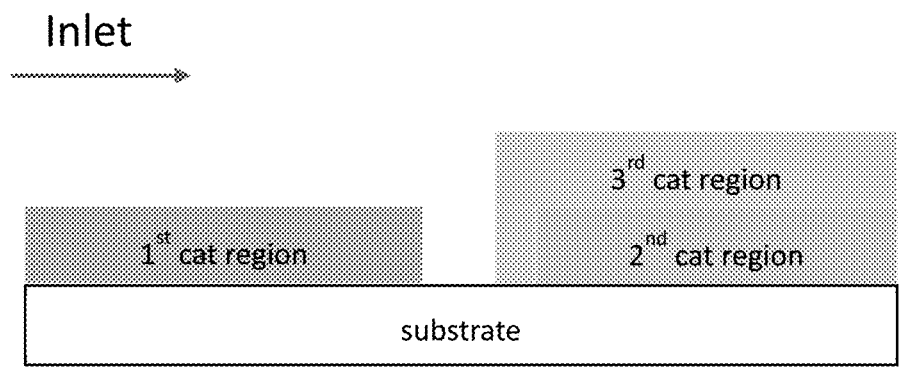
FIG. 7a depicts a seventh configuration in which second catalytic region extends from the outlet end, third catalytic region extends from the outlet end and covers the second catalytic region, and first catalytic region extends from the inlet end. Preferably the substrate is a flow-through monolith.

FIG. 7a depicts a seventh configuration in which second catalytic region extends from the outlet end, third catalytic region extends from the outlet end and covers the second catalytic region, and first catalytic region extends from the inlet end. Preferably the substrate is a flow-through monolith.

Figure 7B:
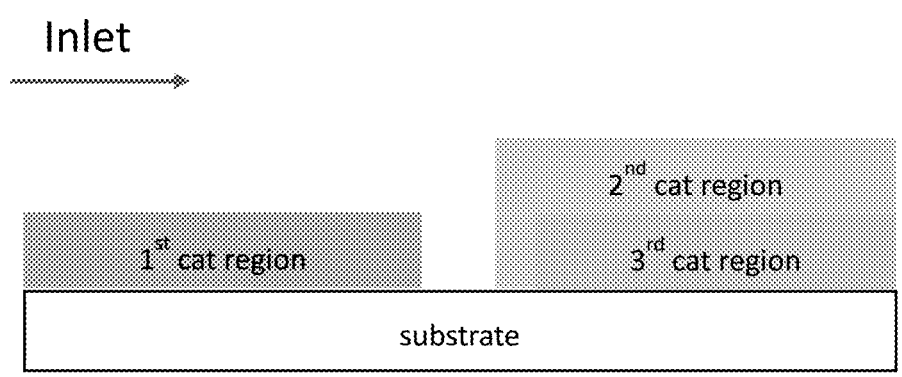

FIG. 7b depicts a variation of the seventh configuration, with 2$^{nd}$ catalytic region overlies 3$^{rd}$ catalytic region.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

In some embodiments, the first catalytic region can be supported/deposited directly on the substrate (e.g., see FIGS. 1a-7b). In certain embodiments, the second catalytic region can be supported/deposited directly on the substrate (e.g., see FIGS. 1a, 2a, 3a, 4a, 5a, 6a, and 7a). In other embodiments, the third catalytic region is supported/deposited directly on the substrate (e.g., see FIGS. 1b, 2b, 3b, 4b, 5b, 6b, and 7b).

In certain embodiments, at least 50% of the first catalytic region is not covered by the second catalytic region and/or the third catalytic region. In preferred embodiments, at least 60%, 70%, or 80% of the first catalytic region is not covered by the second catalytic region and/or the third catalytic region. In more preferred embodiments, at least 90% or 95% of the first catalytic region is not covered by the second catalytic region and/or the third catalytic region. In most preferred embodiments, 100% of the first catalytic region is not covered by the second catalytic region and/or the third catalytic region.

Another aspect of the present disclosure is directed to a method for treating a vehicular exhaust gas containing NO$_x$, CO, and HC using the catalyst article described herein. Catalytic converters equipped with the TWC made according to this method show improved compared to conventional TWC (with the same PGM loading), also show especially improved performance in cold start stage and better THC and NO$_x$ light off performance.

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Comparative Catalyst A:

Comparative Catalyst A is a commercial three-way (Pd-Rh) catalyst with a double-layered zone structure. The bottom layer consists of Pd supported on a washcoat of a first CeZr mixed oxide, La-stabilized alumina, and Ba promotor. The washcoat loading of the bottom layer was about 1.9 $g/in^3$ with a Pd loading of 81 $g/ft^3$ and 34 $g/ft^3$ [front (50%) and rear (50%), respectively]. This washcoat was coated from the inlet and outlet face of a ceramic substrate (600 cpsi, 2.5 mil wall thickness) using standard coating procedures with coating depth targeted of 50% of the substrate length, dried at 90° C. and calcined at 500° C. for 45 mins.

The top layer consists of Rh supported on a washcoat of a second CeZr mixed oxide, La-stabilized alumina, and Ba promotor. The washcoat loading of the top layer was about 1.6 g/in$^3$ with a Rh loading of 4.5 g/ft$^3$. This washcoat was coated from the inlet and outlet face of a ceramic substrate (600 cpsi, 2.5 mil wall thickness) using standard coating procedures with coating depth targeted of 50% of the substrate length, dried at 90° C. and calcined at 500° C. for 45 mins.

The total washcoat loading of Comparative Catalyst A was about 3.5 g/in$^3$. Ceria amount in the bottom layer was about 23.5 g, with a ceria loading of 0.36 g/in$^3$. Ceria amount in the top layer was about 15.5 g, with a ceria loading of 0.24 g/in$^3$.

Catalyst B:
First Catalytic Region:

The first catalytic region consists of Rh supported on a washcoat of a first CeZr mixed oxide, Pd, La-stabilized alumina, and Ba promotor. The washcoat loading of the first catalytic region was about 1.5 g/in$^3$ with a 133 g/ft$^3$ of Pd and of 3.6 g/ft$^3$ of Rh loading.

This washcoat was coated from the inlet face of the ceramic substrate containing the first catalytic region from above, using standard coating procedures with coating depth targeted of 35% of the substrate length, dried at 90° C.

Second Catalytic Region:

The second catalytic region consists of Pd supported on a washcoat of a first CeZr mixed oxide, La-stabilized alumina, and Ba promotor. The washcoat loading of the second catalytic region was about 1.8 g/in$^3$ with a Pd loading of 18 g/ft$^3$.

This washcoat was coated from the outlet face of a ceramic substrate (600 cpsi, 2.5 mil wall thickness) using standard coating procedures with coating depth targeted of 65% of the substrate length, dried at 90° C. and calcined at 500° C. for 45 mins.

Third Catalytic Region:

The third catalytic region consists of Rh supported on a washcoat of a third CeZr mixed oxide and La-stabilized alumina. The washcoat loading of the third catalytic region was about 1.7 g/in$^3$ with a Rh loading of 4.5 g/ft$^3$.

The third washcoat was then coated from the outlet face of the ceramic substrate containing the first and the second catalytic regions from above, using standard coating procedures with coating depth targeted of 90% of the substrate length, dried at 90° C. and calcined at 500° C. for 45 mins.

The coating order was second, first and third region. (E.g., see FIG. 2a)

Catalyst C:

Catalyst C was prepared according to the similar procedure as Catalyst B with the exception that the coating order was changed to second, third and first region. (E.g., see FIG. 3a)

Catalyst D:

Catalyst D was prepared according to the similar procedure as Catalyst C with the exception that first and second catalytic region lengths were changed from 35% and 65% to 30% and 70%, respectively.

Catalyst E:

Catalyst E was prepared according to the similar procedure as Catalyst C with the exception that Pd/Rh loading in first catalytic region was 133/4.1 g/ft$^3$.

Catalyst F:

Catalyst F was prepared according to the similar procedure as Catalyst C with the exception that Pd/Rh loading in first catalytic region was 133/8.5 g/ft$^3$.

Table A below summarizes ceria amount and ceria loading in each catalytic region of Catalysts B-F.

TABLE A

Ceria amount/loading in Catalyst B-F

| | 1$^{st}$ Catalytic Region | | 2$^{nd}$ Catalytic Region | | 3$^{rd}$ Catalytic Region | |
|---|---|---|---|---|---|---|
| | CeO$_2$ amount (g) | CeO$_2$ loading (g/in$^3$) | CeO$_2$ amount (g) | CeO$_2$ loading (g/in$^3$) | CeO$_2$ amount (g) | CeO$_2$ loading (g/in$^3$) |
| Catalyst B | 4.0 | 0.17 | 15.4 | 0.36 | 6.8 | 0.16 |
| Catalyst C | 4.0 | 0.17 | 15.4 | 0.36 | 6.8 | 0.16 |
| Catalyst D | 3.5 | 0.17 | 16.5 | 0.36 | 7.3 | 0.16 |
| Catalyst E | 4.0 | 0.17 | 15.4 | 0.36 | 6.8 | 0.16 |
| Catalyst F | 4.0 | 0.17 | 15.4 | 0.36 | 6.8 | 0.16 |

Example 1: Back Pressure Reduction

The Back Pressure (BP) performances of Comparative Catalyst A, Catalysts B-D were tested over a gas flow mater equipment. As shown Table 1, Catalysts B-D of the present invention present significantly lower BP when compared with Comparative Catalyst A.

TABLE 1

Back Pressure Results

| Sample | Back pressure [kPa] | Relative BP [%] |
|---|---|---|
| Comparative Catalyst A | 9.87 | 100 |
| Catalyst B | 9.56 | 89 |
| Catalyst C | 9.55 | 89 |
| Catalyst D | 9.57 | 90 |

Example 2: Vehicle Testing Procedures and Results

The fresh performances of Comparative Catalyst A and Catalysts B-D were tested over a vehicle of 1.0-liter engine with WLTC (Worldwide harmonized Light vehicles Test Cycle). Bag data from the tailpipe are shown in Table 2. Catalysts B, C, and D of the present invention presents significantly lower emission of THC and NO$_x$ compared with Comparative Catalyst A. (e.g., see the improved performance related with around 22% and 52% improvement respectively on THC and NO$_x$ emission, when Catalyst D is compared with Comparative Catalyst A)

TABLE 2

Results of Exhaust Emissions by Vehicle Diluted Bag Data

| | Exhaust Emissions (g/km) | | | |
|---|---|---|---|---|
| | THC | NMHC | CO | NO$_x$ |
| Comparative Catalyst A | 0.0211 | 0.0192 | 0.3402 | 0.0080 |
| Catalyst B | 0.0171 | 0.0155 | 0.4909 | 0.0036 |
| Catalyst C | 0.0169 | 0.0154 | 04997 | 0.0039 |
| Catalyst D | 0.0164 | 0.0151 | 0.4588 | 0.0038 |

Example 3: Vehicle Testing Procedures and Results

The bench aged samples of Comparative Catalyst A and Catalysts B-D were tested separately over a vehicle of 1.0-liter engine with WLTC. Comparative Catalyst A and Catalysts B-D were bench aged under 4.3-L engine in the same run for 50 hrs with four mode aging cycle, with peak bed temperature at 980° C. of the catalysts.

Bag data from the tailpipe are shown in Table 3. Catalysts B, C and D of the present invention presents significantly lower emission of THC, CO, and $NO_x$ compared with Comparative Catalyst A.

TABLE 3

Results of Exhaust Emissions by Vehicle Diluted Bag Data

| | Exhaust Emissions (g/km) | | | |
| --- | --- | --- | --- | --- |
| | THC | NMHC | CO | $NO_x$ |
| Comparative Catalyst A | 0.0398 | 0.0345 | 0.8176 | 0.0185 |
| Catalyst B | 0.0258 | 0.0225 | 0.4531 | 0.0152 |
| Catalyst C | 0.0250 | 0.0212 | 0.4108 | 0.0124 |
| Catalyst D | 0.0221 | 0.0201 | 0.4595 | 0.0121 |

Example 4: Vehicle Testing Procedures and Results

The bench aged samples of Comparative Catalyst A, Catalyst C, E and Catalyst F were tested over a vehicle of 1.0-liter engine with WLTC. The bench aging under 4.3-L engine in the same run for 50 hrs with four mode aging cycle, with peak bed temperature at about 980° C. of the catalysts. Results of vehicle exhaust diluted bag data are shown in Table 4. Catalyst C, Catalyst E, and Catalyst F of the present invention present lower emission of THC, CO, and $NO_x$, compared with Comparative Catalyst A (e.g., see the improved performance related with around 45%, 47%, and 50% improvement respectively on THC, CO, and $NO_x$ emission, when Catalyst F is compared with Comparative Catalyst A).

TABLE 4

Emission Results by Vehicle Diluted Bag Data

| | Exhaust Emissions (g/km) | | | |
| --- | --- | --- | --- | --- |
| | THC | NMHC | CO | $NO_x$ |
| Comparative Catalyst A | 0.0398 | 0.0345 | 0.8176 | 0.0185 |
| Catalyst C | 0.0280 | 0.0244 | 0.5302 | 0.0145 |
| Catalyst E | 0.0249 | 0.0221 | 0.5105 | 0.0127 |
| Catalyst F | 0.0218 | 0.0192 | 0.4306 | 0.0092 |

We claim:

1. A catalyst article for treating exhaust gas comprising:
a substrate comprising an inlet end, an outlet end with an axial length L;
a first catalytic region beginning at the inlet end and extending for less than the axial length L, wherein the first catalytic region comprises a first palladium component and a first oxygen storage capacity (OSC) material comprising ceria;
a second catalytic region beginning at the outlet end and extending for less than the axial length L, wherein the second catalytic region comprises a second palladium component and a second OSC material comprising ceria;
a third catalytic region beginning at the outlet end and extending for less than the axial length L, wherein the third catalytic region comprises a third rhodium component and a third OSC material comprising ceria;
wherein at least a portion of the first catalytic region is not covered by the second catalytic region and/or the third catalytic region; and
wherein (a) the ceria amount in the first catalytic region is less than 50% of the total ceria amount in the first, second, and third catalytic regions; or (b) the ceria loading in the first catalytic region is less than 50% of the sum of the ceria loading in the first, second, and third catalytic regions.

2. The catalyst article of claim 1, wherein the first catalytic region extends for 1 to 50 percent of the axial length L.

3. The catalyst article of claim 1, wherein the second catalytic region extends for 50 to 90 percent of the axial length L.

4. The catalyst article of claim 1, wherein the second catalytic region overlaps with the first catalytic region for 1 to 15 percent of the axial length L.

5. The catalyst article of claim 1, wherein the total length of the second catalytic region and the first catalytic region equals to the axial length L.

6. The catalyst article of claim 1, wherein the total length of the second catalytic region and the first catalytic region is less than the axial length L.

7. The catalyst article of claim 1, wherein the third catalytic region extends for 50 to 95 percent of the axial length L.

8. The catalyst article of claim 1, wherein the first catalytic region further comprises a first rhodium component.

9. The catalyst article of claim 1 wherein the first catalytic region comprises 0.1-300 g/ft³ of the first palladium component.

10. The catalyst article of claim 1, wherein the ceria amount in the first catalytic region is no greater than 40% of the total ceria amount in the first, second, and third catalytic regions.

11. The catalyst article of claim 1, wherein the ceria loading in the first catalytic region is no greater than 40% of the sum of the ceria loading in the first, second, and third catalytic regions.

12. The catalyst article of claim 1, wherein the first OSC material is selected from the group consisting of cerium oxide, a ceria-zirconia mixed oxide, and an alumina-ceria-zirconia mixed oxide.

13. The catalyst article of claim 12, wherein the first OSC material comprises the ceria-zirconia mixed oxide.

14. The catalyst article of claim 1, wherein the second catalytic region is essentially free of PGM metals other than the second palladium component.

15. The catalyst article of claim 1, wherein the second catalytic region comprises 0.1-50 g/ft³ of the second palladium component.

16. The catalyst article of claim 1, wherein the third catalytic region comprises 0.1-20 g/ft³ of the third rhodium component.

17. The catalyst article of claim 1, wherein the first catalytic region is supported/deposited directly on the substrate.

18. The catalyst article of claim 1, wherein the second catalytic region is supported/deposited directly on the substrate.

19. The catalyst article of claim 1, wherein the third catalytic region is supported/deposited directly on the substrate.

20. The catalyst article of claim 1, wherein the ratio of the Pd loading in the first catalytic region and the Pd loading in the second catalytic region is at least 3:2.

* * * * *